April 17, 1934. A. H. SEXTON 1,955,611
TABLE FOR MANUFACTURING CEMENTITIOUS TILE
Filed Sept. 14, 1932 2 Sheets-Sheet 1
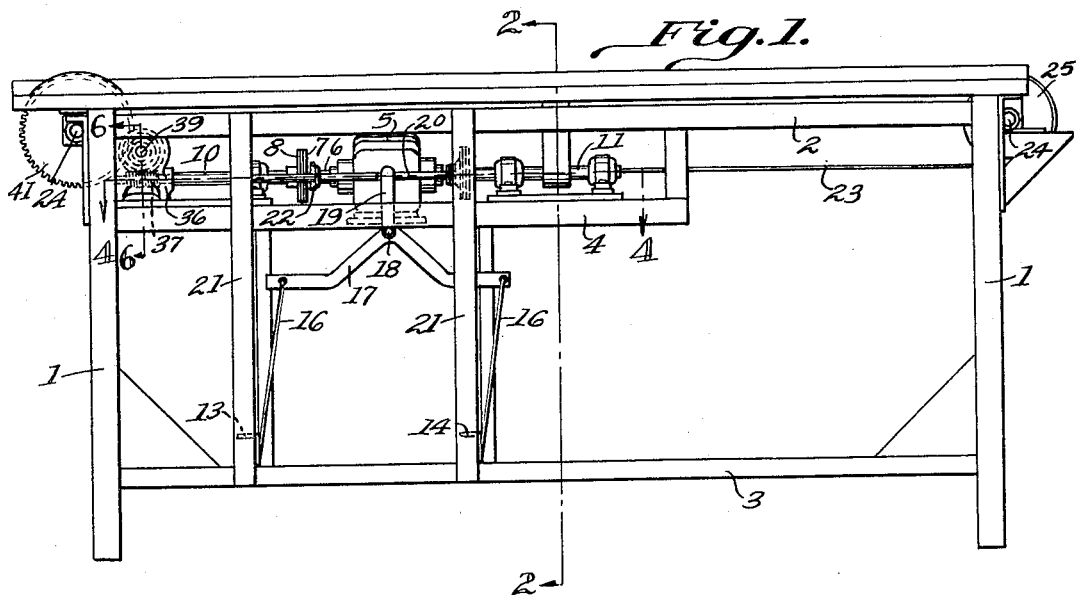
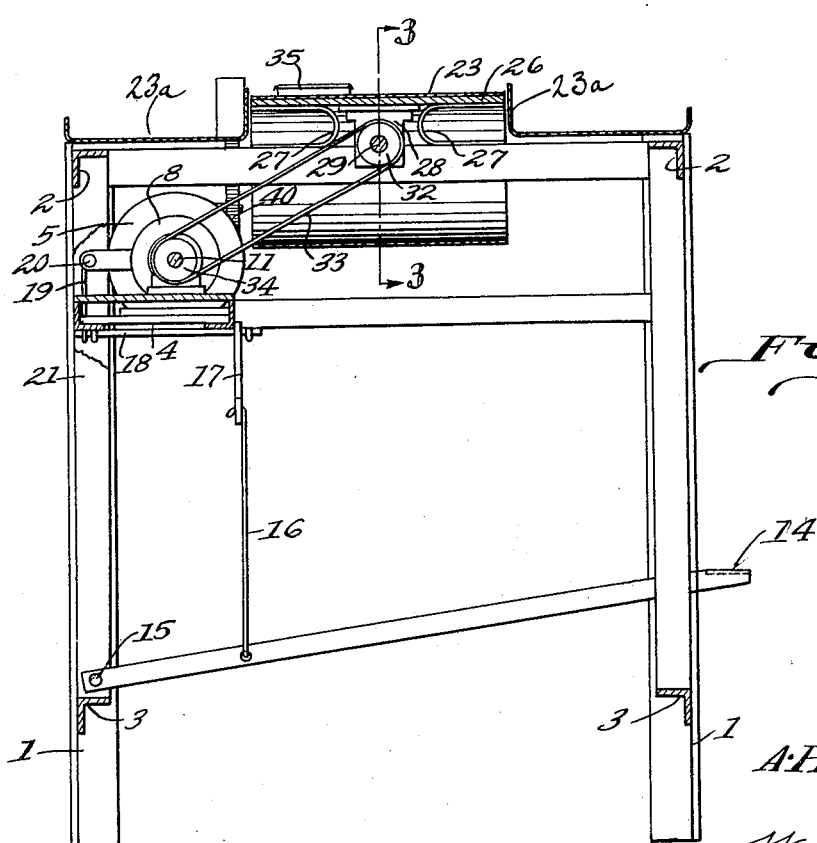
Inventor
A. H. Sexton April 17, 1934.  A. H. SEXTON  1,955,611
TABLE FOR MANUFACTURING CEMENTITIOUS TILE
Filed Sept. 14, 1932   2 Sheets-Sheet 2
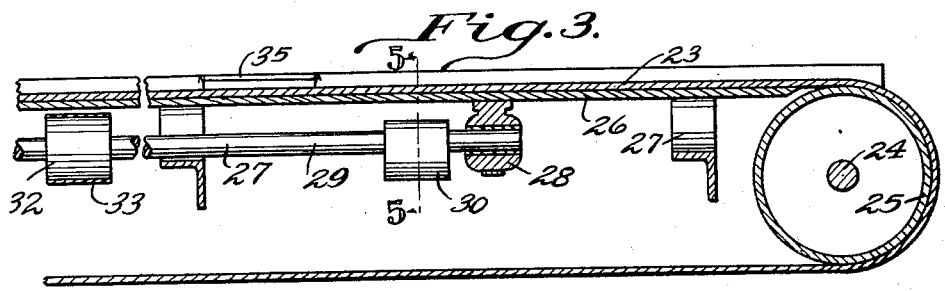
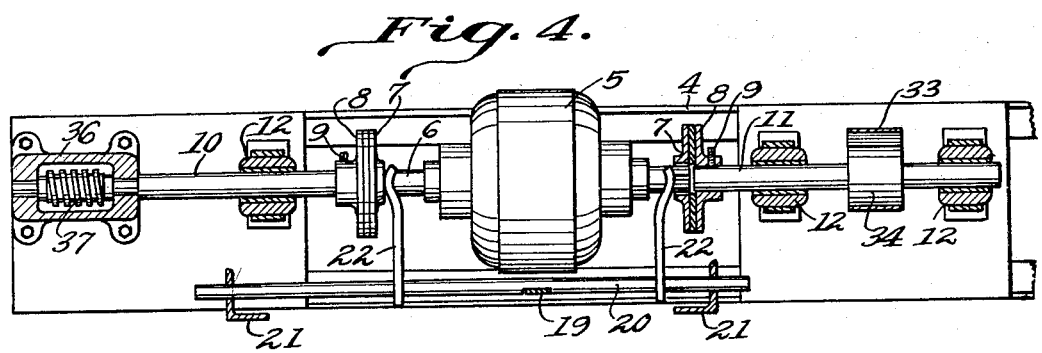
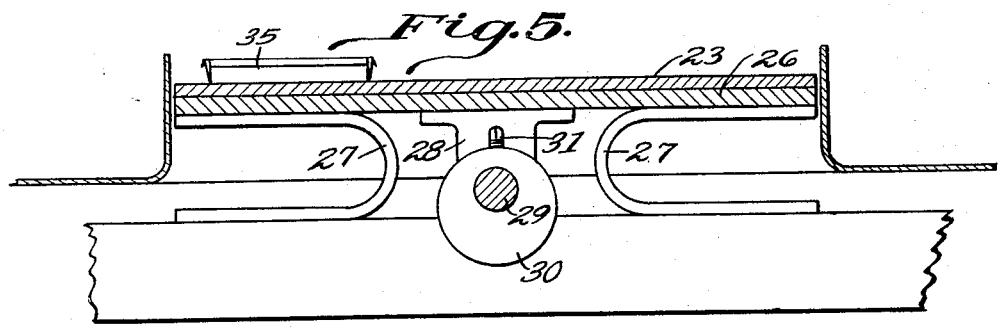
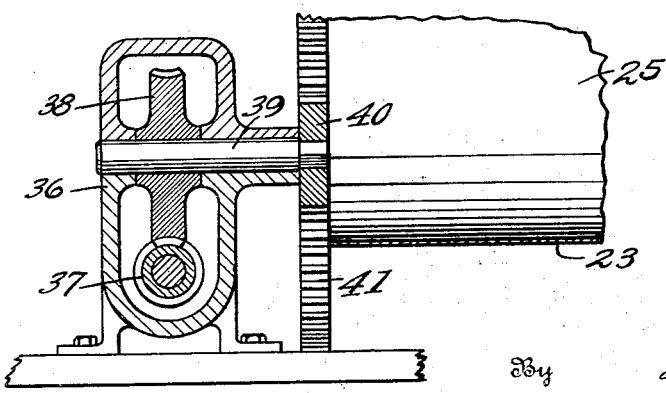
Inventor
A. H. Sexton
By W. S. McDowell
Attorney Patented Apr. 17, 1934

1,955,611

UNITED STATES PATENT OFFICE 1,955,611

TABLE FOR MANUFACTURING CEMENTITIOUS TILE

August H. Sexton, Portsmouth, Ohio, assignor to Superior Cement Corporation, Portsmouth, Ohio, a corporation of Ohio Application September 14, 1932, Serial No. 633,157

9 Claims. (Cl. 25—41)

This invention relates to an improved forming table for use in the manufacture of cementitious tile or similar monolithic building units, and the primary object thereof resides in the provision of a table formed for the reception of molds in which the cementitious materials used in tile and building unit manufacture are contained in a formative state and wherein provision is made for vibrating the molds, while the latter are disposed on the table, for the purpose of producing tile or the like having smooth dense outer surfaces, to dispel air from the cementitious mixtures contained within the molds, to properly distribute mineral coloring matter when the latter is used in the formation of tile, and to secure other advantages hereinafter more particularly pointed out.

It is another object of the invention to provide a tile-forming table of the character set forth wherein the mold receiving portion of the table is formed to comprise a movable belt and wherein provision is made, under the control of the operator, to first vibrate the molds when initially positioned on the belt and later to conduct the molds to desired points of discharge.

For a further understanding of the invention, reference is to be had to the following description and the accompanying drawings, wherein:

Fig. 1 is a side elevation of the improved tile forming table comprising the present invention;

Fig. 2 is a vertical transverse sectional view taken through the table on the plane indicated by the line 2—2 of Fig. 1;

Fig. 3 is a vertical longitudinal section view taken through the mold receiving belt of the table on the plane indicated by the line 3—3 of Fig. 2;

Fig. 4 is a horizontal sectional view disclosing the motor and driving shaft of the table, the plane of the section being indicated by the line 4—4 of Fig. 1;

Fig. 5 is a transverse sectional view on the plane indicated by the line 5—5 of Fig. 3, disclosing the eccentric shaft and associated mechanism;

Fig. 6 is a detail vertical sectional view of the drive mechanism for the conveyor belt, on the plane indicated by the line 6—6 of Fig. 1.

Referring more particularly to the drawings, my improved table comprises a frame preferably composed of angle members and arranged to include vertical legs 1 united at their upper ends by means of horizontally extending bars 2. Additional horizontal extending bars 3 may be provided for imparting the desired rigidity and strength to the frame structure consistent with the work required thereof. Secured to the frame structure below its top and along one side is a shelf 4, which carries an electric motor 5. The shaft 6 of the motor projects at each end beyond the motor housing and slidably keyed to the projecting ends of the shaft 6 are disk-like friction clutch members 7. Under the control of the table operator, these clutch members may be selectively engaged with corresponding driven clutch members 8 which, in this instance, are shown as being secured by set screws or the like 9 with longitudinally aligned shafts 10 and 11 rotatably supported in bearings 12 mounted in connection with the shelf 4.

To control the selective rotation of the shafts 10 and 11, the table is provided with a pair of pivoted treadles 13 and 14, each of which is pivotally mounted as at 15 in connection with the frame structure of the table. Intermediately of their lengths, the treadles are united by means of rods 16 with the outer ends of a yoke 17. The intermediate portion of the yoke 17 is fixed to a rock shaft 18 suitably journaled for rotation transversely of the lower part of the shelf 4. One end of the rock shaft has fixed thereto a crank arm 19, which has its upper end, as shown in Fig. 4, received within a notch formed in a shifting rod 20, the latter being slidably received in openings provided in spaced angle members 21 forming a part of the table frame structure. Fixed to the rod 20 are clutch engaging arms 22 which are located in contact with the keyed driving members 7. By this construction, the operator upon depressing the treadle 13, will cause the rotation of the rock shaft 18 through the provision of the yoke 17, which results in the movement of the rod 20 so that one of the arms 22 will force one of the clutch members 7 in a direction to frictionally engage the complemental clutch member 8, thereby effecting the rotation of the shaft 10 which is used, as will be later described, in operating the conveyor belt 23 of the table. If the treadle 14 is depressed, the other clutch member will be operated to effect the rotation of the shaft 11, which is employed in vibrating the table, as will be more fully described.

Journaled in the ends of the table are shafts 24 which carry rollers 25 around which passes the endless conveyor belt 23. The upper run of this belt engages with and travels over a longitudinally extending plate 26, which is supported in a horizontal position by means of a plurality of substantially U-shaped springs 27, which are carried by the upper portions of the table frame structure. Depending from the under side of the plate 26 are bearings 28 in which is supported for rotation a shaft 29 provided with a plurality of eccentrics 30, the latter being fixed to the shaft 29 by means of set screws or the like 31. The shaft 29 is also provided with a pulley 32 over which passes a belt 33 which leads to a corresponding pulley 34 arranged for rotation in connection with the shaft 11. Thus by depressing the pedal 14, movement will be imparted to the shaft 11 and thence through the belt 33 to the eccentric shaft 29. Thus, due to the unbalanced condition of the shaft 29 and the spring supports for the plate 26, vibratory movement will be imparted to said table, and the upper run of the belt and the molds 35 positioned on the upper surface of the belt 23 to cause the desired distribution of materials in said molds.

Following this period of vibration of the molds, the latter may be advanced longitudinally of the table and removed to other points of handling by longitudinal travel of the belt 23. This is accomplished by depressing the treadle 13 and releasing the treadle 14. The operation of the treadle 13 results in the rotation of the shaft 10. As shown in Figs. 4 and 6, one end of the shaft 10 enters a housing 36 and has fixed thereto for rotation within the housing a worm 37. The worm meshes with a worm gear 38 fixed upon a transversely extending shaft 39. The outer end of the shaft 39 is squared for the reception of a spur pinion 40, the teeth of which engage with an enlarged gear 41 which is secured to the drive shaft for the belt conveyor 23. In this manner, by merely stepping on the treadle 13, longitudinal movement may be imparted to the belt conveyor to advance the molds 35 to desired points of discharge.

As set forth in my co-pending application, Serial No. 633,158, filed September 14, 1932, the molds 35 comprise sheet metal pans, preferably formed from stainless steel or a copper-silicon alloy. These pan shaped molds are adapted to receive a thin fluid cementitious mixture composed of equal parts (or other desired proportions) of fine sand and cement to which is added water in sufficient quantities to produce a mixture possessing a cream-like consistency. Also, to this mixture, there is added color-imparting ingredients usually in the form of a mineral oxide. This primary mixture is first poured in the pan mold to a suitable depth and the mold is placed on the belt 23 and vibrated by depressing the treadle 14. This vibration of the mold dispels air from the mixture, distributes the coloring matter and settles the cement in the mixture on the smooth inner surface of the mold, so that when the tile sets, its surface in contact with the mold will be of a dense, hard and smooth texture comparable in use with that of fired clay tile. Following the vibration of this primary mixture of cementitious materials, there is applied to the mold a coarser cementitious mixture of plastic consistency which is inserted in the mold over the primary mixture to the level of the upper edges of the mold. The entire mold may be again vibrated for a relatively short period of time and following which the treadle 13 may be depressed to cause travel of the belt in a direction away from the operator to provide space on the belt for subsequent mold-filling and tile-forming operations of a duplicative character. The filled molds may be removed by an operator from the outer end of the belt and transferred to suitable drying racks (not shown) in which the cementitious materials are allowed to remain for a sufficient period of time to insure their hardening or setting. After this, the molds are removed from the tile and subjected to reuse. The details regarding the method of manufacturing the tile have been set forth in my above identified application and therefore do not comprise a part of the present invention which relates specifically to the construction of the table. Lateral stationary guides 23a are provided at the side edges of the belt 23 to confine materials placed on the upper run of the belt against lateral displacement.

While I have described what I consider to be the preferred form of my invention, nevertheless it will be understood by those skilled in the art that the same is subject to considerable modification without departing from the principles of the invention, as the latter has been defined in the following claims.

What is claimed is:

1. A table for manufacturing moldable articles comprising a frame, an endless conveyor belt supported by and movable longitudinally of the frame, a plate arranged beneath the upper run of the conveyor belt to support the same in a horizontal plane, resilient supporting means uniting said plate with the upper portion of said frame, and means for imparting vibrating movement to said plate and the upper run of said belt.

2. In a machine for manufacturing moldable articles, a frame, a flat one piece conveyor belt supported by and movable longitudinally of the frame, resilient means carried by said frame for supporting the upper run of said belt, and means for imparting vibrating movement to said resilient means and the upper run of the belt engaged thereby.

3. In a machine for manufacturing moldable articles, a frame, spaced longitudinally extending guides carried by said frame, a belt having its upper run arranged between said guides, supporting devices carried by said frame and cooperative with the upper run of said belt to support the weight of molding appliances positioned on said belt, and means for imparting vibration to the belt and the molding appliances positioned thereon between said guides.

4. In a machine for manufacturing moldable articles, a frame, a conveyor belt supported by and movable longitudinally of the frame, fixed guides carried by said frame cooperative with the opposite longitudinal edges of the upper run of said belt, and a resiliently supported plate member arranged below the upper run of said belt for effecting the support of molding appliances on the upper surface of the belt.

5. In a machine for manufacturing moldable articles, a frame, a conveyor belt carried by and movable longitudinally of said frame, fixed longitudinally extending guides arranged contiguous to the opposite longitudinal edges of the upper run of said belt, said guides being stationarily supported in connection with said frame, a plate member arranged below and in engagement with the upper run of said belt and extending substantially throughout the length thereof, and resilient supporting means arranged between said plate member and said frame.

6. In a machine for manufacturing moldable articles, a frame, a conveyor belt carried by and movable longitudinally of said frame, fixed longitudinally extending guides arranged contiguous to the opposite longitudinal edges of the upper run of said belt, said guides being stationarily supported in connection with said frame, a plate member arranged below and in engagement with the upper run of said belt and extending substantially throughout the length thereof, resilient supporting means arranged between said plate member and said frame, and means for imparting vibrating movement to said plate member.

7. In a machine for manufacturing moldable articles, a frame structure, rotatably journaled belt wheels arranged at the opposite ends of said frame structure, an endless belt engaging with said wheels, means for driving one of said wheels to impart movement to said belt, stationary longitudinally extending guides carried by said frame structure and arranged contiguous to the opposite longitudinal edges of and projecting above the upper run of said belt, a plate member arranged below and in contact with the upper run of said belt and free from connection with said guides, and resilient supporting means arranged between said plate member and said frame structure.

8. In a machine for manufacturing moldable articles, a frame structure, rotatably journaled belt wheels arranged at the opposite ends of said frame structure, an endless belt engaging with said wheels, means for driving one of said wheels to impart movement to said belt, stationary longitudinally extending guides carried by said frame structure and arranged contiguous to the opposite longitudinal edges of and projecting above the upper run of said belt, a plate member arranged below and in contact with the upper run of said belt and free from connection with said guides, resilient supporting means arranged between said plate member and said frame structure, a shaft rotatably journaled in connection with the under part of said plate member, and an eccentric fixed to rotate with said shaft.

9. In a machine for manufacturing moldable articles, a frame structure, rotatably journaled belt wheels arranged at the opposite ends of said frame structure, an endless belt engaging with said wheels, means for driving one of said wheels to impart movement to said belt, stationary longitudinally extending guides carried by said frame structure and arranged contiguous to the opposite longitudinal edges of and projecting above the upper run of said belt, a plate member arranged below and in contact with the upper run of said belt and free from connection with said guides, resilient supporting means arranged between said plate member and said frame structure, a shaft rotatably journaled in connection with the under part of said plate member, an eccentric fixed to rotate with said shaft, and means for effecting the rotation of the eccentric shaft when said belt is stationary.

AUGUST H. SEXTON.